(12) United States Patent
Gu et al.

(10) Patent No.: US 11,722,336 B2
(45) Date of Patent: Aug. 8, 2023

(54) SELECTION OF TUNNELING PROTOCOL

(71) Applicant: VMware, Inc., Palo Alto, CA (US)

(72) Inventors: Feng Gu, Mountain View, CA (US);
Subin Cyriac Mathew, San Jose, CA (US); Prerit Rodney, Cupertino, CA (US); Chidambareswaran Raman, Campbell, CA (US)

(73) Assignee: VMWARE, INC., Palo Alto, CA (US)

( * ) Notice: Subject to any disclaimer, the term of this patent is extended or adjusted under 35 U.S.C. 154(b) by 318 days.

(21) Appl. No.: 16/285,143

(22) Filed: Feb. 25, 2019

(65) Prior Publication Data

US 2020/0274738 A1 Aug. 27, 2020

(51) Int. Cl.
*H04L 12/46* (2006.01)
(52) U.S. Cl.
CPC ................................. *H04L 12/4633* (2013.01)
(58) Field of Classification Search
CPC .................................................. H04L 12/4633
See application file for complete search history.

(56) References Cited

U.S. PATENT DOCUMENTS

| 10,554,543 | B1* | 2/2020 | Paul ........................ H04L 45/50 |
| 2010/0293284 | A1* | 11/2010 | Song ..................... H04W 48/08 709/230 |
| 2014/0133350 | A1* | 5/2014 | Triess .................... G06F 13/385 370/254 |
| 2016/0087940 | A1* | 3/2016 | Miller .................. G06F 9/45558 726/15 |
| 2017/0126726 | A1* | 5/2017 | Han ......................... H04L 69/22 |
| 2017/0163599 | A1* | 6/2017 | Shen .................... G06F 9/45558 |
| 2018/0006943 | A1* | 1/2018 | Dubey .................... H04L 47/24 |
| 2019/0089557 | A1* | 3/2019 | Sung ...................... H04L 45/245 |

* cited by examiner

*Primary Examiner* — Saad A. Waqas
(74) *Attorney, Agent, or Firm* — Patterson + Sheridan, LLP

(57) ABSTRACT

Certain embodiments herein are directed to a method of by a source virtual tunnel endpoint (VTEP) for selecting a tunneling protocol for encapsulating a packet destined for a destination VTEP. In some embodiments, the method includes receiving the packet for transmission to the destination VTEP. The method further includes determining whether the destination VTEP is configured with a first tunneling protocol. Upon determining that the destination VTEP is configured with the first tunneling protocol, the method includes encapsulating the packet using the first tunneling protocol, and transmitting the encapsulated packet to the destination VTEP. Upon determining that the destination VTEP is not configured with the first tunneling protocol, encapsulating the packet using a second tunneling protocol, and transmitting the encapsulated packet to the destination VTEP.

15 Claims, 4 Drawing Sheets

SELECTION OF TUNNELING PROTOCOL

BACKGROUND

Software defined networking (SDN) comprises a plurality of hosts in communication over a physical network infrastructure, each host having one or more virtualized endpoints such as virtual machines (VMs), containers, or other virtual computing instances (VCIs) that are connected to logical overlay networks that may span multiple hosts and are decoupled from the underlying physical network infrastructure.

SDN involves the use of a management plane (MP) and a control plane (CP). The management plane is responsible for receiving network configuration input from, for example, an administrator and generating desired state data that specifies how the logical network should be implemented in the physical infrastructure. The control plane is responsible for determining the logical overlay network topology and maintaining information about network entities such as logical switches, logical routers, endpoints, etc. The logical topology information specifying the desired state of the network is translated by the control plane into network configuration data that is then communicated to network elements of each host. The network configuration data, for example, includes forwarding table entries to populate forwarding tables at virtual switch(es) provided by the hypervisor (i.e., virtualization software) deployed on each host. An example control plane logical network controller is described in U.S. Pat. No. 9,525,647 entitled "Network Control Apparatus and Method for Creating and Modifying Logical Switching Elements," which is fully incorporated herein by reference.

For example, any arbitrary set of VMs in a datacenter may be placed in communication across a logical Layer 2 network by connecting them to a logical switch. Each logical switch corresponds to a virtual network identifier (VNI). The logical switch is collectively implemented by at least one virtual switch on each host that has a VM connected to the logical switch. The virtual switch on each host operates as a managed edge switch implemented in software by the hypervisor on each host. Forwarding tables at the virtual switches instruct the host to encapsulate packets, using a virtual tunnel endpoint (VTEP) for communication from a participating VM to another VM on the logical network but on a different (destination) host. The original packet from the VM is encapsulated at the VTEP with an outer IP header addressed to the destination host using a mapping of VM IP addresses to host IP addresses. At the destination host, a second VTEP decapsulates the packet and then directs the packet to the destination VM. Logical routers extend the logical network across subnets or other network boundaries using IP routing in the logical domain.

For example, the VTEP may be associated with software components, or it may itself, provide Layer 2 tunneling services for encapsulating egress packets from VMs and decapsulating ingress packets to implement a logical overlay network to interconnect VMs running on different hosts as part of the same layer 2 logical overlay network, meaning as part of the same logical layer-2 network/broadcast domain in the logical overlay network. Tunneling services may be implemented using tunneling protocols such as virtual extensible local area network (VXLAN), Stateless Transport Tunneling (STT), Generic Network Virtualization Encapsulation (GENEVE), or Generic Routing Encapsulation (GRE).

VTEP services may be implemented at each host or at a gateway. Edge VTEPs or hypervisor-based VTEPs are generally connected to virtual switches implemented by the hypervisor for virtual machines on the same physical host. Hardware VTEPs are often integrated into top-of-rack (TOR) switches, but could be provided as a stand-alone appliance for bridging logical overlay networks with physical networks.

It should be noted that the term VTEP originally referred to a "VXLAN tunneling endpoint" and VNI referred to a "VXLAN network identifier." However, while originally the terms "VTEP" and "VNI" referred to "VXLAN" tunneling protocol, they are now often used regardless of the tunneling protocol, and therefore referred to herein as a "virtual" instead. This "backronym" can be misleading as the tunnel is not itself virtual, but does carry logical overlay networking traffic, which is sometimes referred to as virtual network traffic.

Different VTEPs (e.g., hardware VTEPs, edge VTEPs, or hypervisor-based VTEPs on different hosts) may be configured to use, meaning they support, different tunneling protocols for encapsulation/decapsulation. For example, different hosts may be provided and configured by different vendors that utilize different virtualization technologies, and the hardware VTEPs associated with such hosts, or hypervisor-based VTEPs running on such hosts may accordingly use different tunneling protocols supported by the different virtualization technologies. Accordingly, techniques for allowing such different VTEPs supporting different tunneling protocols to communicate may be beneficial.

SUMMARY

Herein described are one or more embodiments of a method for use by a source virtual tunnel endpoint (VTEP) for selecting a tunneling protocol for encapsulating a packet destined for a destination VTEP. The method includes receiving the packet for transmission to the destination VTEP. The method further includes determining whether the destination VTEP is configured with a first tunneling protocol. Upon determining that the destination VTEP is configured with the first tunneling protocol, the method includes encapsulating the packet using the first tunneling protocol, and transmitting the encapsulated packet to the destination VTEP. Upon determining that the destination VTEP is not configured with the first tunneling protocol, encapsulating the packet using a second tunneling protocol, and transmitting the encapsulated packet to the destination VTEP.

Also described herein are embodiments of a computer system, wherein software for the computer system is programmed to execute the method described above.

Also described herein are embodiments of a non-transitory computer readable medium comprising instructions to be executed in a computer system, wherein the instructions when executed in the computer system perform the method described above.

DETAILED DESCRIPTION

Certain embodiments herein provide techniques for enabling source VTEPs in a logical network to select (e.g., based on a priority) a tunneling protocol of a plurality of tunneling protocols supported by the source VTEP to use for encapsulating and transmitting packets to a destination VTEP based on which tunneling protocol(s) the destination VTEP supports. In particular, in certain embodiments a control plane configures each VTEP with information indicative of the tunneling protocol(s) supported by other VTEPs in the datacenter. Further, each VTEP may be configured with a priority order among the tunneling protocols it supports.

For example, some VTEPs may only support VXLAN while other VTEPs may support both VXLAN and GENEVE. Certain tunneling protocols may support more features than other tunneling protocols. Accordingly, a VTEP may be configured to select or prioritize use of one tunneling protocol over another, such as based on the features supported by the tunneling protocols. For example, GENEVE may support more features than VXLAN and be prioritized over use of VXLAN. Accordingly, the source VTEP determines if a particular destination VTEP supports GENEVE, and if so, encapsulates packets for the destination VTEP using GENEVE and transmits them to the destination VTEP. If the source VTEP determines the particular destination VTEP does not support GENEVE, it encapsulates packets for the destination VTEP using VXLAN and transmits them to the destination VTEP. There are other examples where using one tunneling protocol over others may result in better performance. For instance, a physical NIC associated with a VTEP may offer certain capabilities (e.g., receive-side load-balancing, or offloading) for higher performance that would make using one tunneling protocol more advantageous over others.

Figure 1:
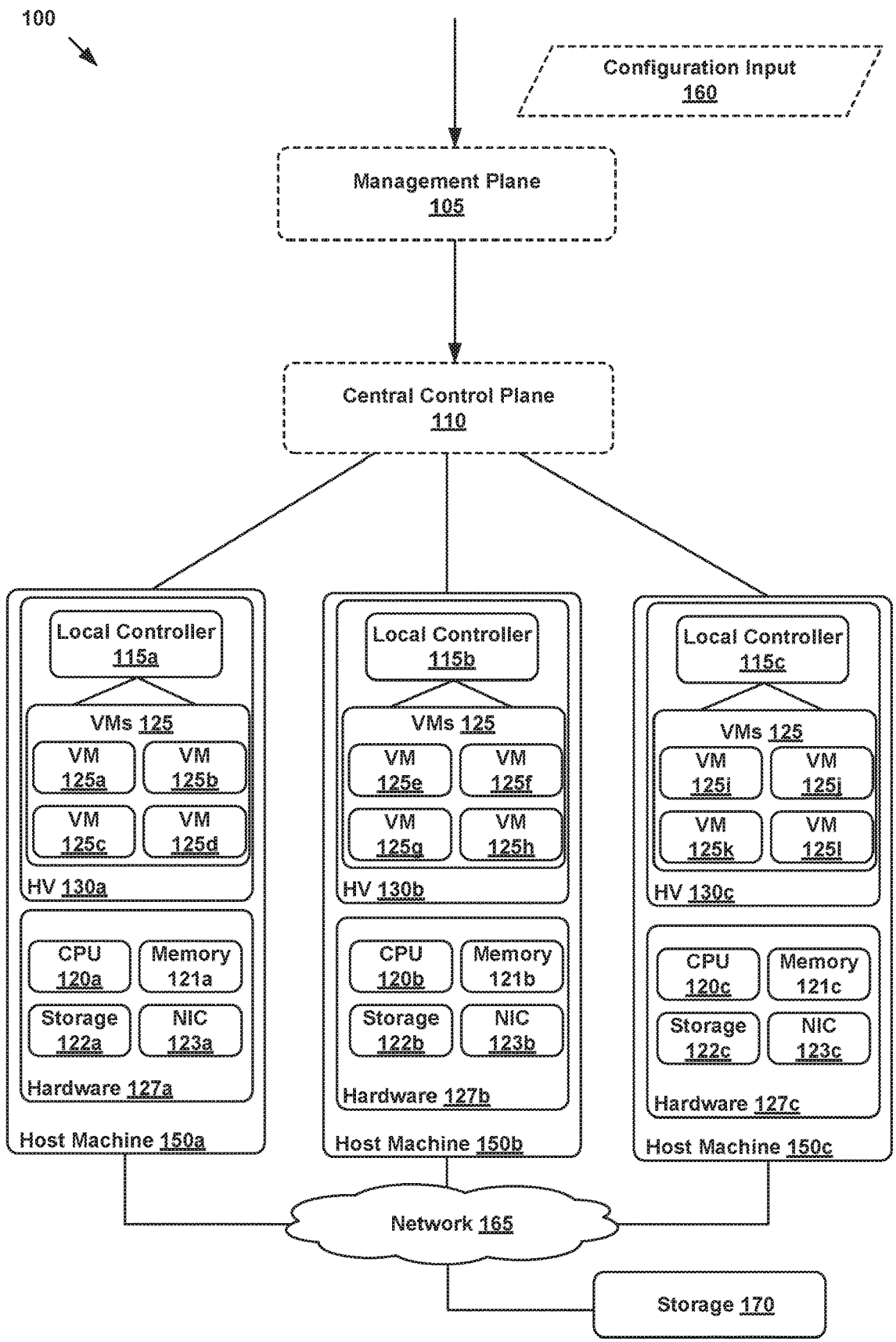
FIG. 1 illustrates an example block diagram of a network control system for a virtual network, according to one example embodiment.

FIG. 1 is a block diagram of a network control system 100 including a management plane (MP) 105, a central control plane (CCP) 110 and multiple local controllers (also called the local control plane (LCP)) 115a, 115b, and 115c that operate on host machines ("hosts") 150a, 150b, and 150c, respectively, which are physical computing devices that support the execution of virtual machines (VMs) 125a-125l (collectively referred to as VMs 125 and individually referred to as VM 125). Although certain embodiments herein are described with respect to VMs, it should be noted that the same techniques may be applied to other types of VCIs. The term "VCI" may refer to VMs, containers, Docker containers, data compute nodes, isolated user space instances, namespace containers, and the like. It should be noted that though certain embodiments are described with a particular number of hosts in an SDN environment, the techniques discussed herein are applicable to any number of hosts (e.g., having any number of VMs coupled to any number of logical switches) in any number of SDN environments. The hosts are physical computing devices that support the execution of virtual machines (VMs) 125a-125l (collectively referred to as VMs 125 and individually referred to as VM 125).

Hosts 150a-150c (collectively referred to as hosts 150 and individually referred to as host 150) are typically on server grade hardware platforms ("hardware"), such as hardware 127a-127c, respectively. An example of a server grade hardware platform is the x86 architecture platform. Hosts 150a-150c may be geographically co-located servers on the same rack or on different racks in any location within a data center. Each of hosts 150a-150c is configured with a virtualization layer, referred to herein as a hypervisor (also referred to as HV). Each of hypervisors 130a-130c abstracts processor, memory, storage, and networking resources of a corresponding hardware platform 127a-127c into multiple virtual machines 125. VMs 125 on the same host 150 may use any suitable guest operating system(s) and run concurrently with the other VMs 125.

Hypervisor 130 architecture may vary. In some embodiments, hypervisor 130 is installed as system level software directly on the hosts 150 (often referred to as a "bare metal" installation) and conceptually interposed between the physical hardware and the guest operating systems executing in VMs 125. Alternatively, hypervisor 130 may conceptually run "on top of" a conventional host operating system in the server. In some implementations, hypervisor 130 may comprise system level software as well as a privileged VM (not shown), such as a "Domain 0" or "Root Partition" VM, that has access to the physical hardware resources of the host 150. In such implementations, a virtual switch, VTEP, etc., along with hardware drivers, may reside in the privileged VM.

Hardware platform 127 of each host 150 includes components of a computing device such as one or more processors (CPUs) 120, a system memory 121, a storage system 122, a network interface (referred to in FIG. 1 as "NIC") 123, a host bus adapter (HBA) (not shown), and other I/O devices such as, for example, a mouse and keyboard (not shown). Processor 120 is configured to execute instructions such as executable instructions that perform one or more operations described herein. The executable instructions may be stored in memory 121 and in storage system 122. Network interface 123 enables host 150 to communicate with other devices via a communication medium, such as network 165. Network interface 123 may include one or more network adapters or ports, also referred to as Network Interface Cards (NICs), for connecting to one or more physical networks. Network 165 may be a local area network ("LAN"), a wide area network ("WAN"), or a network of networks, such as the Internet.

Memory 121 is hardware for allowing information, such as executable instructions, configurations, and other data, to be stored and retrieved. Memory 121 is where programs and data are kept when processor 120 is actively using them. Memory 121 may be volatile memory or non-volatile memory. The HBA of a host 150 couples the host to one or more external storages, such as storage 170, which may be a storage area network (SAN) or a distributed virtual SAN. Other external storages that may be used include a network-attached storage (NAS) and other network data storage systems, which may be accessible via network interface 123. Storage system 122 represents persistent storage device(s). Storage 122 may be one or more hard disks, flash memory modules, solid state disks, and/or optical disks. Data on storage disks of storage 122 may be organized into blocks, and each block on storage system 122 may be addressable. Although storage 122 is shown as being local to host 150, storage 122 may be external to host 150, such as by connection via the host 150's HBA. In addition, storage systems 122a-122c may be used as part of a storage virtualization platform, such as virtual SAN (VSAN).

Hypervisors 130a-130c abstract processor, memory, storage, and/or networking resources of hosts 150a-150c, respectively, into multiple VMs 125a-125l, 125e-12h, and 125*i*-125*l* that can run side-by-side on the same hosts 150*a*-150*c*. That is, the virtualization software partitions physical hosts 150*a*-150*c* into multiple secure and portable VMs 125. Each VM 125 may represent a complete virtual system—with virtual processors, virtual memory, virtual networking interface, virtual disk storage, and its own BIOS. For example, each VM 125 comprises a software-based virtual network adaptor (not shown), also referred to as a virtual network interface card (VNIC) that is logically connected to instantiations of the control plane (e.g., LCPs 115*a*-115*c*) running on host machines 150*a*-150*c* and provides network access for the VM 125. Each VM 125's VNIC is typically connected to a corresponding LCP 115 through a virtual switch.

Though shown as single entities, it should be understood that MP 105 and CCP 110 may be implemented as distributed or clustered applications or components. For example, MP 105 may include multiple computing devices that implement management plane functions, and a CCP 110 may include multiple central (or distributed) controller computers, virtual machines, containers, or processes that implement CCP functions. An example of a computing device may include a VM 125 executing on a host 150. In such an example, multiple VMs 125 running on the same or different hosts 150 may implement management and/or control plane functions.

In certain embodiments, MP 105 is responsible for receiving network configuration input 160 through an interface (e.g., an application programming interface or user interface). For example, users (e.g., network administrators) may input network configuration data through a user interface such as a command-line interface or graphical user interface. Network configuration input may, for example, comprise configuration data indicative of how multiple endpoints, such as VM 125, running on different hosts 150 may be connected through a logical Layer-2 or overlay network. More specifically, in certain embodiments, each logical network configuration for each logical network includes data defining one or more endpoints and the connections between the endpoints. For example, network configuration input may include information describing logical entities, such as logical ports (e.g., assigning media access control (MAC) and/or Internet protocol (IP) addresses to the logical ports) for logical networking elements, how logical networking elements are interconnected, various service rules (such as distributed firewall rules) to be enforced at one or more logical networking elements, etc.

Based on network configuration input, MP 105 generates desired state data that specifies how the logical network should be implemented in the physical infrastructure. CCP 110 then updates/implements the logical network based on the desired state information through LCPs 115*a*-115*c*. For example, CCP 110 is responsible for managing and maintaining information about virtual machines, virtual switches, virtual routers, VTEPs, etc. implemented on host machines controlled by CCP 110. Further, CCP 110 is responsible for configuring physical network elements implemented by host machines 150*a*-150*c* to ensure that the defined logical network topologies and policies are properly implemented. When users provide configuration changes (e.g., creating or deleting logical entities, modifying properties of logical entities, changing relationships between logical entities, etc.), the changes to the desired state are distributed as updates to CCP 110. LCPs 115*a-c* are responsible for translating data received from CCP 110 into configuration data formatted for their respective VMs 125. In some embodiments, the local controller is a daemon that operates in the virtualization software of the host machine.

Figure 2:
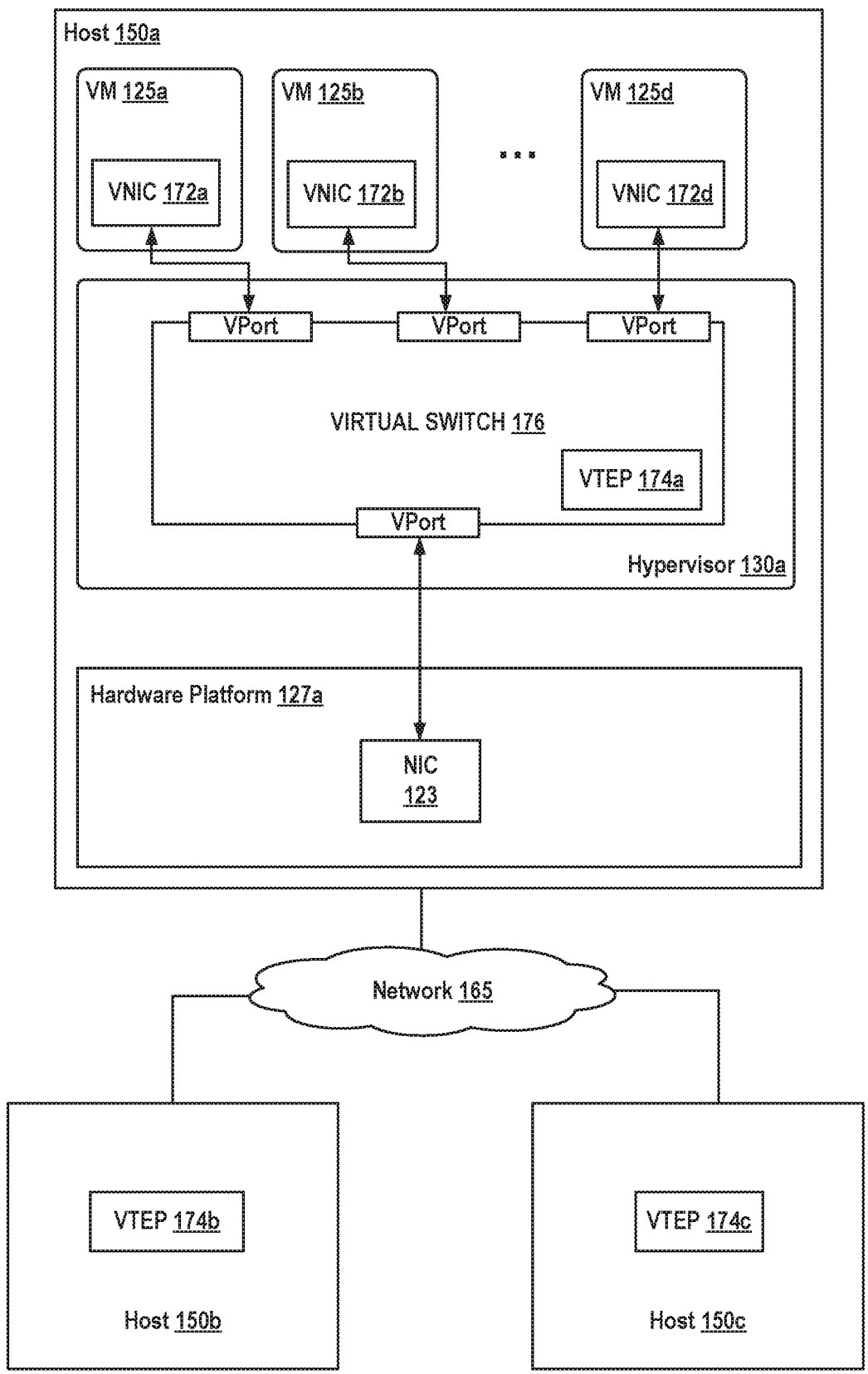
FIG. 2 depicts a block diagram showing details of a host running a hypervisor, according to an embodiment.

FIG. 2 depicts a block diagram showing details of a host 150*a* running a hypervisor 130*a*, according to an embodiment. FIG. 2 also shows hosts 150*b* and 150*c* connected to host 150*a* through network 165.

Hypervisor 130*a* of host 150*a* includes a virtual switch 176, which serves as an interface between the hosted virtual machines 125 running on host 150*a*, NIC 123, as well as other physical resources available on host 150*a*. VMs 125 of FIG. 2 are analogous to and substantially similar to VMs 125 of FIG. 1. Hypervisor 130 includes VTEP 174*a*, which may be implemented in software by virtual switch 176, or outside of virtual switch 176 (e.g., as coupled to a virtual port of virtual switch 176) and functionally coupled to virtual switch 176 using forwarding tables. Accordingly, VTEP 174*a* is responsible for providing VTEP services for each of the VMs 125 on the same host machine 150*a* as VTEP 174.

It should be noted that though a single VTEP 174*a* is shown as associated with VMs 125 on the same host machine 150*a*, there may be multiple VTEPs on the same host machine. For example, different sets of VMs 125 may be associated with different such multiple VTEPs, such as based on being coupled to different virtual switches and/or different physical NICs on the host machine 150*a*. The multiple VTEPs may support the same or different tunneling protocol(s).

Further, though a VTEP is shown running in hypervisor 130, a VTEP as discussed herein may also refer to a hardware VTEP, which may be a hardware device coupled to network 165 in this example. In certain aspects, a hardware VTEP provides encapsulation/decapsulation services for VMs or physical computing devices, and may similarly by coupled to such VMs or physical computing devices using forwarding tables as discussed.

Each of the virtual machines 125 may include a virtual network interface card (VNIC) 172, which is responsible for exchanging packets between the virtual machine 125 and hypervisor 130. VNICs 172 may be, in some cases, a software abstraction of a physical network interface card. Each virtual machine 125 is connected to a virtual port (vport) provided by virtual switch 176, and virtual switch 176 is connected to physical network interface 123 to allow network traffic to be exchanged between virtual machines 125 executing on host machine 150 and other network destinations such as virtual machines hosted by hosts 150*b* and/or 150*c*. Hosts 150*b* and 150*c* comprise components that are similar to the components of host 150*a* shown in FIG. 2. For example, each one of hosts 150*b* and 150*c* comprises a hypervisor, shown in FIG. 1 as hypervisors 127*b* and 127*c*, respectively, which implements a virtual switch configured with a VTEP. The VTEPs associated with hosts 150*b* and 150*c* are shown in FIG. 2 as VTEPs 174*b* and 174*c*, respectively. Other components of hosts 150*b* and 150*c*, which are similar to the components of host 150*a*, are not shown for simplicity.

A logical network is implemented using VTEPs for encapsulating data packets that are generated by VMs 125 or hypervisor 130*a* for delivery through the underlying data network 165. For example, a source VM 125 running on host 150*a* may generate a packet for a destination VM (not shown) on host 150*c*. The packet may include a header including a source address (e.g., IP/MAC address) of the source VM 125, and a destination address of the destination VM on host 150*c*.

The source VM 125 sends the packet to virtual switch 176, in response to which virtual switch 176 implicitly determines that the destination VM is not directly coupled to virtual switch 176 and thus, in accordance with its forwarding table, forwards the packet to VTEP 174a to encapsulate the packet received from source VM 125 to generate an encapsulated packet. In particular, VTEP 174a may add a new header (referred to as an "outer header") to the original packet to generate the encapsulated packet (referred to as an "outer packet"). The original packet encapsulated by VTEP 174a may be referred to as an "inner packet" and the header of the original packet may be referred to as an "inner header." VTEP 174a may include a source address of VTEP 174a (e.g., source VTEP) in the outer header, and a destination address of destination VTEP 174c associated with the destination VM executing on host 150c. VTEP 174a may then forward the encapsulated packet back to virtual switch 176, which sends the encapsulated packet out of host 150a via NIC 123 based on the destination address in the outer header.

Destination VTEP 174c receives the encapsulated packet and decapsulates the encapsulated packet to extract the original packet. Based on the destination IP address in the header of the original packet, destination VTEP 174c forwards the original packet to the destination VM 125.

As discussed, VTEPs of a logical network may be configured with different tunneling protocols. Accordingly, in certain embodiments, all VTEPs of a logical network are configured to support a common tunneling protocol, e.g., VXLAN. Therefore, all VTEPs can at least use the common tunneling protocol for communication between one another. Further, some VTEPs in the logical network are configured to support one or more additional tunneling protocols, such as GENEVE. The one or more additional tunneling protocols may each provide additional features as compared to the common tunneling protocol. For example, GENEVE is a more advanced tunneling protocol that provides an outer header format with more options as compared to VXLAN. As such, using GENEVE allows for transmitting information that may otherwise not be possible with VXLAN.

Accordingly, certain embodiments described herein are directed to techniques for allowing a source VTEP in a logical network that is configured with multiple tunneling protocols to select and utilize one of the multiple tunneling protocols. Note that GENEVE and VXLAN are used herein merely as example tunneling protocols. There are various other types of tunneling protocols, some of which may be more advanced or desirable in certain scenarios than others. For example, other tunneling protocols include the NVGRE (Network Virtualization using Generic Routing Encapsulation), stateless transport tunneling (STT), etc. The techniques described herein are, therefore, not limited to any certain type or types of tunneling protocols. Also, the techniques herein are described in relation the network diagrams shown in FIGS. 1 and 2. However, the network diagrams of FIGS. 1 and 2 are illustrated merely as examples. The techniques described herein are applicable to any underlying physical network that supports a logical network including at least some VTEPs that are configured with multiple tunneling protocols.

To select and utilize a certain tunneling protocol, it is important for a source VTEP in a logical network to be able to determine what tunneling protocol(s) the destination VTEP supports. For example, in the embodiment of FIG. 2, it is important for each one of VTEPs 174 to be able to determine the type(s) of tunneling protocol(s) that the other VTEPs support. As such, in certain embodiments, each VTEP is configured to report its IP address as well as the tunneling protocol(s) that the VTEP supports to CCP 110. For example, a hardware VTEP may be configured to send such information to CCP 110 directly. For a hypervisor based VTEP, the hypervisor on a host may be configured to send such information to the CCP 110 on behalf of the VTEP, such as via an LCP on the host.

For example, hypervisor 130a may be configured to transmit a report to CCP 110 that indicates the IP address associated with VTEP 174a as well as the tunneling protocols that VTEP 174a supports, which in this example include VXLAN and GENEVE. Hypervisor 130a may send the report when host 150a first come online, when a VTEP configuration changes, etc. Similarly, host 150b also reports VTEP 174b's IP address and tunneling protocol, which in this example, is VXLAN. Further, host 150c reports VTEP 174c's IP address and tunneling protocols, which in this example, include VXLAN and GENEVE.

In response to receiving these reports from hosts 150, CCP 110 combines each VTEP 174's IP address and the tunneling protocol(s) into a corresponding VTEP information set ("information set") that CCP 110 then pushes to all other VTEPs 174. As further described in relation to FIG. 3, based on the information sets of other VTEPs, each source VTEP is able to select a tunneling protocol to use for communicating with the other VTEPs.

The information CCP 110 includes in the information sets may vary in different embodiments. For example, in certain embodiments, for each VTEP 174, CCP 110 may be configured to report a tunneling protocol only if the tunneling protocol is different from the common (e.g., default) tunneling protocol that all VTEPs are configured with. This reduces the amount of information that needs to be transmitted by CCP 110, which results in a more efficient use of network and compute resources. Note that a default tunneling protocol is a protocol that each VTEP 174 is configured to use for encapsulation if no other tunneling protocol is supported.

For example, in FIG. 2, VTEPs 174a-174c all support VXLAN, as a default tunneling protocol, while VTEPs 174a and 174c also support GENEVE. In such an example, the information set associated with VTEP 174b may only include VTEP 174b's IP address. In this example, although VTEP 174b's information set does not explicitly indicate VXLAN, it provides an implicit indication to VTEP 174a and 174c that VTEP 174b only supports VXLAN. In contrast, the information set associated with VTEP 174a, for example, may include VTEP 174a's IP address as well as an indication that VTEP 174 supports tunneling protocol GENEVE. VTEP 174a's information set, therefore, provides an implicit indication to other VTEPs that VTEP 174a supports both VXLAN and GENEVE. In certain other embodiments, CCP 110 may be configured to indicate all the tunneling protocols that each VTEP 174 supports in a corresponding information set. For example, in such embodiments, VTEP 174a's would include information that explicitly indicates VTEP 174a's supports use of both VXLAN and GENEVE.

Having received information sets associated with the other VTEPs 174 in the logical network, a source VTEP 174 is able to select a tunneling protocol for encapsulating packets destined for one of the other VTEPs 174 based on the other VTEP 174's information set.

Figure 3:
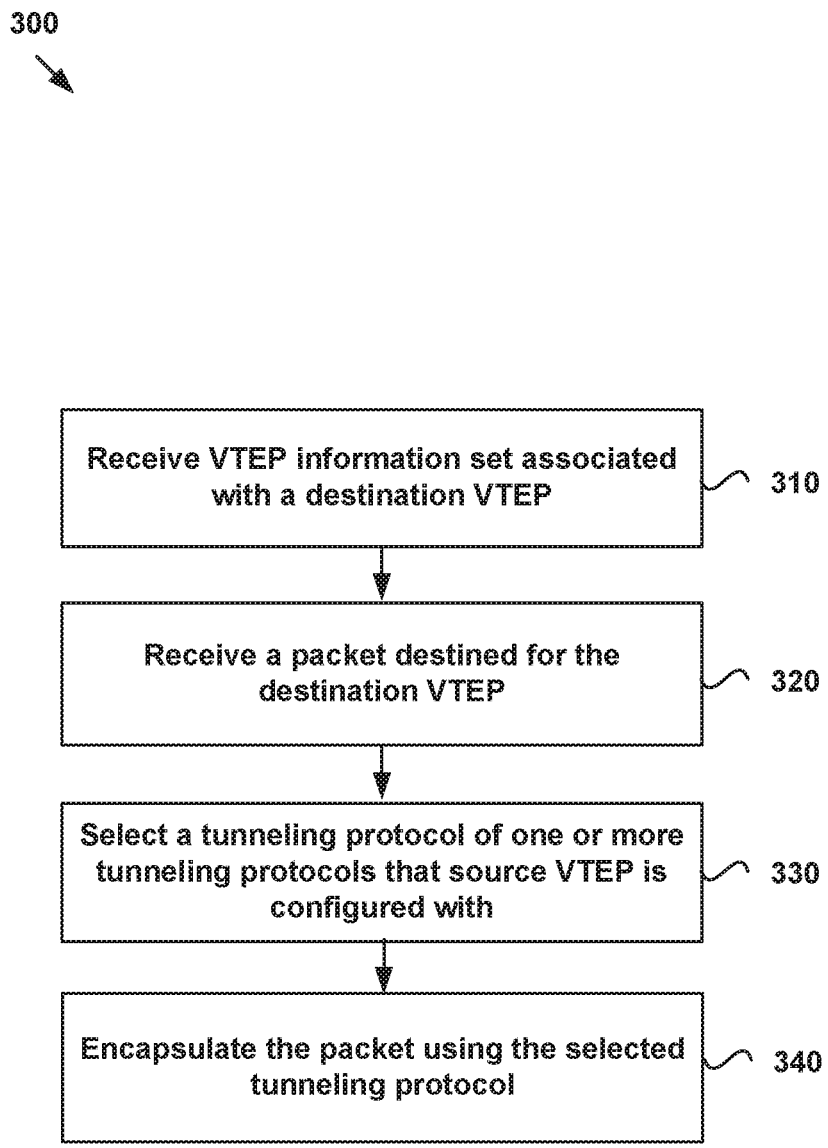
FIG. 3 illustrates example operations performed by a source VTEP when encapsulating a packet for transmission to a destination, according to an embodiment.

FIG. 3 illustrates example operations 300 performed by a source VTEP when encapsulating a packet for transmission to a destination VTEP. Operations 300 are described herein with reference to VTEP 174a as being the source VTEP and VTEP 174c as being the destination VTEP in some examples. Also, operations 300 are described with reference to certain tunneling protocols, such as GENEVE, VXLAN, and NVGRE. However, the embodiments described herein are not dependent on the type of tunneling protocols and are applicable to any different types of tunneling protocols.

At block 310, the source VTEP receives an information set from a CCP for each one of the other VTEPs in a logical network that the source VTEP is a part of. For example, VTEP 174*a* receives an information set for VTEP 174*b*, indicating that VTEP 174*b* only supports VXLAN. VTEP 174*a* also receives VTEP 174*c*'s information set, indicating that VTEP 174*c* supports both VXLAN and GENEVE.

At block 320, the source VTEP receives a packet for transmission to a destination VTEP. For example, VTEP 174*a* receives a packet from one of VMs 125*a*-125*d* that is destined for one of VMs 125*i*-125*l*, which are associated with VTEP 174*c*, as shown in FIG. 1.

At block 330, the source VTEP selects one of its tunneling protocols for encapsulating the packet. In certain embodiments, the source VTEP selects a tunneling protocol based on a certain set of prioritization instructions (also referred to as "prioritization configuration"). The prioritization instructions may involve varying levels of complexity in different embodiments. In certain embodiments, the prioritization instructions may configure the source VTEP to determine whether the destination VTEP uses a certain tunneling protocol, based on the destination VTEP's information set. If yes, the source VTEP uses that tunneling protocol for encapsulating the packet at step 340. If not, the source VTEP proceeds to using the default protocol. For example, source VTEP 174*a* may be configured to determine whether destination VTEP 174*c* uses GENEVE. Upon determining that it does, source VTEP 174*a* then proceeds to using GENEVE for encapsulating the packet. In an example where VTEP 174*b* is the destination VTEP, however, VTEP 174*a* determines that VTEP 174*b* does not support GENEVE and, therefore, defaults to using VXLAN for encapsulating a packet destined for VTEP 174*b*. In certain embodiments, the source VTEP may not be able to determine whether or not the destination VTEP uses a certain tunneling protocol. In such embodiments, the source VTEP is configured to use the default protocol.

In certain embodiments, some VTEPs in a logical network may be configured with more than two tunneling protocols. In such embodiments, the source VTEP's prioritization instructions may involve a similar if-and-else approach such that the source VTEP may first determine whether the destination VTEP uses a first tunneling protocol, having the highest priority, based on the destination VTEP's information set. If yes, the source VTEP uses the first tunneling protocol; else, the source VTEP next determines whether the destination VTEP uses a second tunneling protocol, having the next highest priority, and so on, until the source VTEP reaches the default protocol. As an example, VTEP 174*a* may be configured with VXLAN, NVGRE, and GENEVE, with GENEVE having that highest priority in that order. In such an example, VTEP 174*a* first determines whether destination VTEP 174*c* uses GENEVE. If yes, source VTEP 174*a* uses GENEVE; else source VTEP 174*a* next determines whether destination VTEP 174*c* uses NVGRE. If yes, NVGRE is used; else VTEP 174*a* proceeds to using VXLAN. As described above, in certain situations, if the source VTEP is not able to determine whether or not the destination VTEP uses a certain tunneling protocol, it is configured to use the default protocol.

In certain embodiments, the prioritization instructions may instead comprise a priority list that indicates a number of tunneling protocols and their corresponding priorities. In such embodiments, the source VTEP may be configured by the prioritization instructions to examine the priority list, select the tunneling protocol with the highest priority and then examine the destination VTEP's information set to determine whether the destination VTEP uses the tunneling protocol. If not, the source VTEP selects a tunneling protocol with the next highest priority and so on.

In certain embodiments, the prioritization instructions may include an examination of the type and/or capabilities provided by a physical NIC (e.g., NIC 123) associated with VTEP 174. For example, in such embodiments, the VTEP may be configured by the prioritization instructions to select a first tunneling protocol over a second tunneling protocol based on determining that the corresponding physical NIC provides certain capabilities that makes using the first protocol more advantageous. Examples of those capabilities may include providing TCP segment offloading for an inner packet, checksum offloading for an inner packet, receive-side load balancing based on an inner packet etc. Such capabilities may work with one tunneling protocol but not others.

In certain embodiments, CCP 110 may reconfigure a VTEP's prioritization configurations. For example, source VTEP 174*a* may be configured to utilize VXLAN, NVGRE, and GENEVE for tunneling, with GENEVE having the highest priority in that order. However, CCP 110 may reconfigure source VTEP 174*a*'s order of priority by transmitting a message to source VTEP 174*a* that comprises a different order.

In certain embodiments, CCP 110 may reconfigure a source VTEP 174's prioritization configuration specifically with respect to a certain destination VTEP. For example, in destination VTEP 174*c*'s information set, CCP 110 may include certain prioritization instructions on how tunneling protocols should be prioritized by source VTEP 174*a* when engaging in tunneling with destination VTEP 174*c*. In certain embodiments, CCP 110 may instead include such prioritization instructions in a message to source VTEP 174*a* that is separate from destination VTEP 174*c*'s information set. Once source VTEP 174*a* receives the prioritization instructions from CCP 110, source VTEP 174*a* is configured to use them to configure its own prioritization configuration when engaging in tunneling with destination VTEP 174*c*.

In certain embodiments, CCP 110 may permanently reconfigure a source VTEP's prioritization configuration in relation to all destination VTEPs. For example, CCP 110 may send a message to source VTEP 174*a* that reconfigures source VTEP 174*a*'s prioritization configuration, such that at any point subsequent to receiving the message, source VTEP 174*a* would be configured to use the prioritization instructions received from CCP 110 for prioritizing and selecting tunneling protocols. As an example, the prioritization instructions received from CCP 110 may include a prioritization list that is different from the prioritization list used by the source VTEP. In certain embodiments, VTEPs in a logical network may not themselves be configured with any prioritization configuration. In such embodiments, the VTEPs may rely on CCP 110's prioritization instructions, received, for example, as part of the information sets or through some other messaging mechanism.

At block 340, the source VTEP encapsulates the packet using the selected tunneling protocol. For example, once a certain tunneling protocol is prioritized, the source VTEP selects the prioritized tunneling protocol and uses it to encapsulate the packet. The encapsulated packet is then transmitted through the network to the destination VTEP. The destination VTEP uses the same tunneling protocol to decapsulate the packet.

Note that the embodiments described herein with respect to FIG. 3 are similarly applicable to packets received by a source VTEP for broadcasting and multicasting. For example, source VTEP 174a may receive a packet to be broadcasted to VTEPs 174b and 174c. In such an example, source VTEP 174a separately prioritizes the use of its tunneling protocols for each one of VTEPs 174b and 174c based on the VTEP's corresponding information set. Source VTEP 174a then encapsulates a packet for transmission to VTEP 174b using a tunneling protocol that may be different from the tunneling protocol used for encapsulating a packet for transmission to VTEP 174c.

In certain embodiments, a certain VTEP in a logical network may go through a change in tunneling protocol. As an example, an administrator may take a host offline, update its virtualization software (e.g., hypervisor etc.), including the VTEP, and then reboot the host. In such an example, when the host comes online, it is configured to send a report to CCP 110 to update the VTEP's IP address and indicate the VTEP's tunneling protocol(s). Based on the report, CCP 110 then creates a new or updated information set for the VTEP and transmits the information set to all the VTEPs in the logical network. When a source VTEP in the logical network receives a packet to transmit to the VTEP having the updated information set, the source VTEP prioritizes its tunneling protocols based on the update information set.

Another example of a host undergoing a change in tunneling protocol occurs when the host is migrated from one SDN environment to another. In such an example, as described in further detail in relation to FIG. 4, the host's VTEP configuration, including the tunneling protocols, may change.

Figure 4:
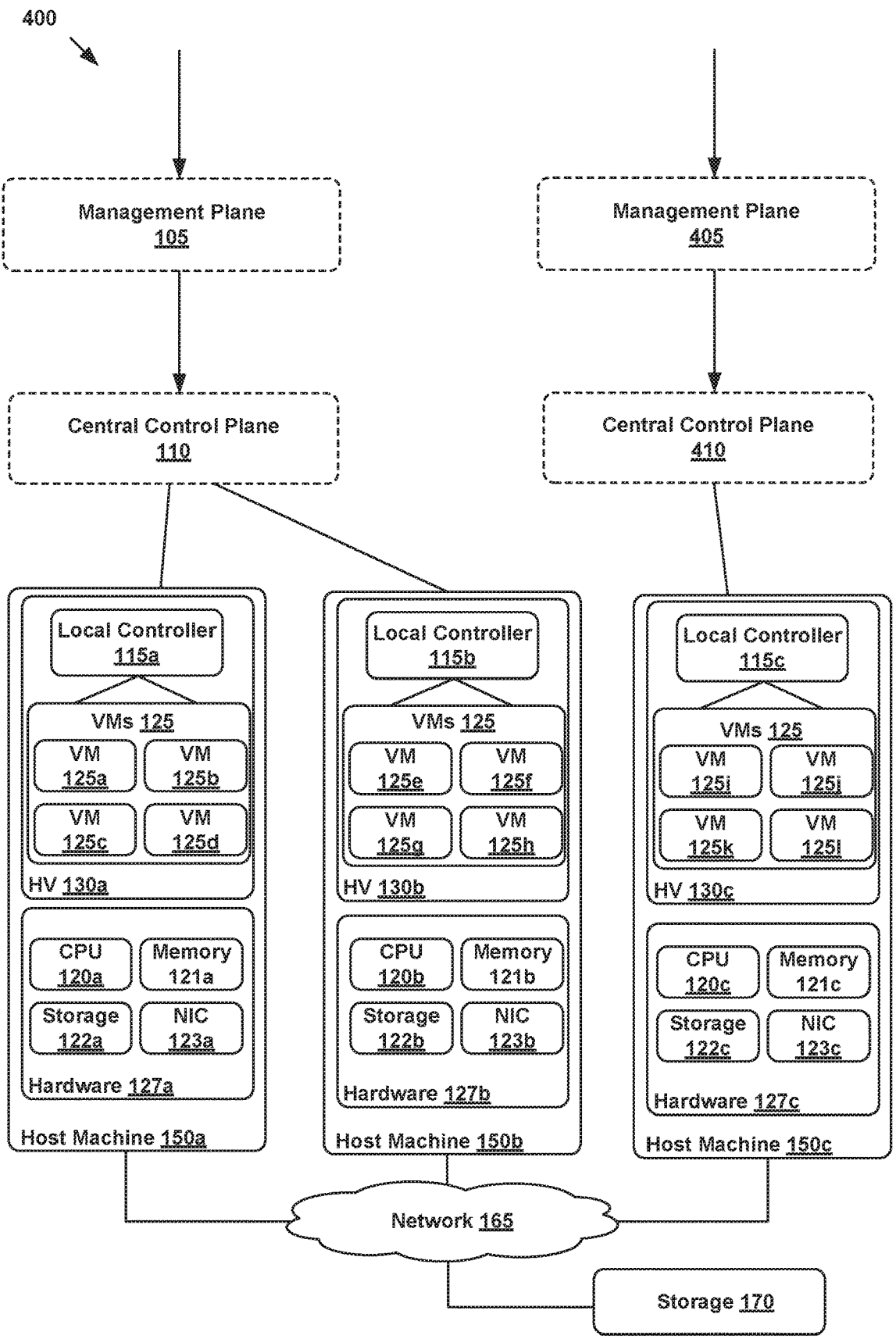
FIG. 4 illustrates an example block diagram of a network control system corresponding to two SDN environments, according to one example embodiment.

FIG. 4 is a block diagram of a network control system 400 including MP 105, CCP 110, MP 405, and CCP 410. MP 105 and CCP 110 are associated with a first SDN environment. MP 405 and CCP 410 are associated with a second SDN environment. Network control system 400 further includes hosts 150a and 150b in the first SDN environment and coupled to MP 105 and CCP 110. MP 105 is configured to maintain a static configuration of the logical overlay network of the first SDN environment, such as connectivity of VMs to logical switches, logical routers, etc. Further, CCP 110, based on the static configuration, determines certain runtime state information for implementing the logical overlay network on hosts. The runtime state information includes configuration of forwarding tables for virtual switches, VTEP tables, MAC/VTEP mappings, etc. The static configuration may not change during operation of the overlay network. However, the runtime state information may change, as further discussed herein. Network control system 400 further includes host 150c in the second SDN environment and coupled to MP 405 and 410.

In certain embodiments, each of hosts 150a, 150b, and 150c may initially have been part of the first SDN environment, as shown in the network control system 100 of FIG. 1. A migration procedure may then be started to move hosts 150a-150c to the second SDN environment. During the transition phase, not all hosts are migrated at once, meaning some hosts may be in different SDN environments and still need to communicate with one another. Accordingly, FIG. 4 may be illustrative of such a transition phase where host 150c has been migrated to the second SDN environment, while hosts 150a and 150b are still part of the first SDN environment. In order for VMs on hosts in different SDN environments to communicate with one another, the VTEPs on each of the hosts need to be configured to ensure that packets are encapsulated and sent to the appropriate destination VTEP on the host running the destination VM.

Prior to migration from the first SDN environment to the second SDN environment, a migration coordinator (not shown) requests and receives from MP 105/CCP 110 static configuration and runtime state information of the first SDN environment. The migration coordinator further pushes the static configuration and runtime state information of the first SDN environment to the MP 405/CCP 410 of the second SDN environment. After the MP 405/CCP 410 receives the static configuration and runtime state information, host migration begins. The host to be migrated, in this case host 105c, is disconnected from the MP 105/CCP 110, and then connected to MP 405/CCP 410. MP 405/CCP 410 pushes static configuration and runtime state information related to host 150c received from MP 105/CCP 110 to host 105c, and then traffic to/from host 105c is resumed. For example, as part of the static configuration and runtime state information VTEP 174c receives the information sets associated with VTEP 174a and 174b.

In certain embodiments, when host 150c migrates to the second SDN environment, the corresponding VTEP 174c may be reconfigured with new or additional tunneling protocols. For example, while in the first SDN environment, VTEP 174c may be configured to only use VXLAN but, after the migration, VTEP 174c may be reconfigured to use VXLAN and GENEVE. In such an example, after the migration, host 150c notifies CCP 410 of its VTEP IP address and new protocols, in response to which, CCP 110 generates an information set for VTEP 174c that indicates VTEP 174c's use of VXLAN and GENEVE. In certain embodiments, VTEP 174c's information set is then transmitted to CCP 110 of the first SDN environment, which CCP 110 receives and shares with VTEPs 174a and 174b. Accordingly, VTEP 174a and 174b are then able to prioritize their tunneling protocol selection, based on VTEP 174c's updated information set. In certain embodiments, CCP 410 is able to share VTEP 174c's updated information set with CCP 110 through a migration coordinator.

Accordingly the embodiments described herein provide a technical solution to a technical problem of how to communicate between VTEPs that support different tunneling protocols. The embodiments described herein are directed to configuring source VTEPs in a logical network to, for example, select a tunneling protocol based on an examination of the destination VTEP's information set. In such an example, two VTEPs that are both configured with a certain advanced tunneling protocol are able to utilize the protocol even if the protocol is not a default protocol used by all VTEPs in the logical network.

The various aspects described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more aspects of the invention may be useful machine operations. In addition, one or more aspects of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various aspects described herein may be practiced with other computer system configurations including handheld devices, microprocessor systems, microprocessor-based or programmable consumer electronics, minicomputers, mainframe computers, and the like.

One or more aspects of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more aspects of the present invention have been described in some detail for clarity of understanding, it will be apparent that certain changes and modifications may be made within the scope of the claims. Accordingly, the described aspects are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various aspects may be implemented as hosted aspects, non-hosted aspects or as aspects that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for use by a source virtual tunnel endpoint (VTEP) for selecting a tunneling protocol for encapsulating packets, the method comprising:
   receiving, at the source VTEP, an information set associated with a destination VTEP, the information set indicating a first one or more tunneling protocols supported by the destination VTEP;
   receiving, at the source VTEP, from a central control plane responsible for configuring the source VTEP, prioritization instructions indicating a prioritized tunneling protocol;
   receiving a packet for transmission to the destination VTEP;
   determining, at the source VTEP, based on the information set, that the destination VTEP is not configured with the prioritized tunneling protocol;
   encapsulating, at the source VTEP, the packet using a first tunneling protocol of the first one or more tunneling protocols, based on the determination that the destination VTEP is not configured with the prioritized tunneling protocol; and
   transmitting, at the source VTEP, the encapsulated packet to the destination VTEP.

2. The method of claim 1, further comprising:
   receiving an updated information set associated with the destination VTEP, the updated information set indicating a second one or more tunneling protocols supported by the destination VTEP, wherein the second one or more protocols at least include the prioritized tunneling protocol, wherein the source VTEP is configured to replace use of the information set with use of the updated information set.

3. The method of claim 1, wherein determining that the destination VTEP is not configured with the prioritized tunneling protocol further comprises:
   examining a prioritization list indicating priorities associated with a number of tunneling protocols including the first tunneling protocol and the prioritized tunneling protocol; and
   determining that the prioritized tunneling protocol has a higher priority than the first tunneling protocol.

4. The method of claim 3, wherein the number of tunneling protocols includes a second tunneling protocol.

5. The method of claim 1, wherein determining that the first destination VTEP is not configured with the prioritized tunneling protocol is based on a capability or type of a corresponding physical network interface card.

6. The method of claim 1, wherein the central control plane is configured to implement a logical network on one or more host machines.

7. A computer system, comprising:
   a non-transitory memory comprising executable instructions; and
   a processor in data communication with the memory and configured to execute the executable instructions to cause the computer system to:
      receive, at the source VTEP, one or more information sets associated with a destination VTEP, the one or more information sets indicating a first one or more tunneling protocols supported by the destination VTEP;

receive, at the source VTEP, from a central control plane responsible for configuring the source VTEP, prioritization instructions indicating a prioritized tunneling protocol;

receive, at the source VTEP, a packet for transmission to the destination VTEP;

determine, at the source VTEP, based on the one or more information sets, that the destination VTEP is not configured with prioritized tunneling protocol;

encapsulate, at the source VTEP, the packet using a first tunneling protocol of the first one or more tunneling protocols, based on the determination that the destination VTEP is not configured with the prioritized tunneling protocol; and transmit, at the source VTEP, the encapsulated packet to the first destination VTEP.

8. The method of claim 7, wherein the processor is further configured to cause the computer system to:

receive, at the source VTEP, an updated information set associated with the destination VTEP, the updated information set indicating a second one or more tunneling protocols used by the destination VTEP, wherein the second one or more protocols at least include the prioritized tunneling protocol, wherein the source VTEP is configured to replace use of the information set with use of the updated information set.

9. The computer system of claim 7, wherein the processor being configured to cause the computer system to determine that the destination VTEP is not configured with the prioritized tunneling protocol further comprises the processor being configured to cause the computer system to:

examine a prioritization list indicating priorities associated with a number of tunneling protocols including the first tunneling protocol and the prioritized tunneling protocol; and determine that the prioritized tunneling protocol has a higher priority than the first tunneling protocol.

10. The computer system of claim 9, wherein the number of tunneling protocols includes a second tunneling protocol.

11. The computer system of claim 7, the processor being configured to cause the computer system to determine that the destination VTEP is not configured with the prioritized tunneling protocol is based on a capability or type of a corresponding physical network interface card.

12. The computer system of claim 7, wherein the central control plane is configured to implement a logical network on one or more host machines.

13. A non-transitory computer readable medium having instructions stored thereon for performing a method comprising:

receiving, at a source VTEP, an information set associated with a destination VTEP, the information set indicating a first one or more tunneling protocols supported by the destination VTEP;

receiving, at the source VTEP, from a central control plane responsible for configuring the source VTEP, prioritization instructions indicating a prioritized tunneling protocol;

receiving, at the source VTEP, a packet for transmission to the destination VTEP;

determining, at the source VTEP, based on the information set, that the destination VTEP is not configured with the prioritized tunneling protocol;

encapsulating, at the source VTEP, the packet using a first tunneling protocol of the first one or more tunneling protocols, based on the determination that the destination VTEP is not configured with the prioritized tunneling protocol; and transmitting, at the source VTEP, the encapsulated packet to the destination VTEP.

14. The non-transitory computer readable medium of claim 13, further comprising:

receiving, at the source VTEP, an updated information set associated with the destination VTEP, the updated information set indicating a second one or more tunneling protocols used by the destination VTEP, wherein the second one or more protocols at least include the prioritized tunneling protocol, wherein the source VTEP is configured to replace use of the information set with use of the updated information set.

15. The non-transitory computer readable medium of claim 13, wherein the central control plane is configured to implement a logical network on one or more host machines.

\* \* \* \* \*